(12) United States Patent
Vogman

(10) Patent No.: US 7,162,656 B2
(45) Date of Patent: Jan. 9, 2007

(54) DYNAMIC PROTECTION CIRCUIT

(75) Inventor: Viktor D. Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 10/395,494

(22) Filed: Mar. 24, 2003

(65) Prior Publication Data

US 2004/0193926 A1 Sep. 30, 2004

(51) Int. Cl.
G06F 1/26 (2006.01)
G06F 1/28 (2006.01)
G06F 1/30 (2006.01)
G06F 11/30 (2006.01)

(52) U.S. Cl. ............... 713/340; 323/276; 323/277; 363/56.03

(58) Field of Classification Search ........ 713/300–340; 323/276, 277; 363/56.03
See application file for complete search history.

(56) References Cited

U.S. PATENT DOCUMENTS

| | | | | |
|---|---|---|---|---|
| 4,629,966 A | * | 12/1986 | Quantz | 322/25 |
| 5,023,527 A | * | 6/1991 | Erdman et al. | 318/254 |
| 5,754,414 A | * | 5/1998 | Hanington | 363/21.12 |
| 5,932,997 A | * | 8/1999 | James | 323/351 |
| 5,942,881 A | * | 8/1999 | Okada et al. | 323/277 |
| 6,137,699 A | * | 10/2000 | Sakamoto | 363/50 |
| 6,452,771 B1 | * | 9/2002 | Van Kempen | 361/93.1 |
| 6,539,486 B1 | * | 3/2003 | Rolls et al. | 713/323 |
| 6,631,064 B1 | * | 10/2003 | Schuellein et al. | 361/93.1 |
| 6,777,905 B1 | * | 8/2004 | Maehara | 318/650 |
| 6,804,102 B1 | * | 10/2004 | Hamon et al. | 361/93.3 |
| 2003/0122530 A1 | * | 7/2003 | Hikita | 323/285 |
| 2003/0171909 A1 | * | 9/2003 | Inomoto et al. | 703/23 |

OTHER PUBLICATIONS

PCT Search Report, PCT/US2004/004215, mailed Oct. 6, 2004.

* cited by examiner

Primary Examiner—Lynne H. Browne
Assistant Examiner—James F. Sugent
(74) Attorney, Agent, or Firm—Blakely, Sokoloff, Taylor & Zafman LLP

(57) ABSTRACT

According to one embodiment, a computer system is disclosed. The computer system includes an integrated circuits (IC), a power supply that supplies power to the IC and an over-current protection (OCP) circuit. The OCP circuit prevents the exceeding a predetermined power threshold during a short circuit condition while the IC is enabled to receive a greater power level.

23 Claims, 4 Drawing Sheets

DYNAMIC PROTECTION CIRCUIT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to delivering power to a power sensitive system such as a server system.

BACKGROUND

The integrated circuits within computer (or server) systems are powered by multi-output power supplies that provide Direct current (DC) voltages. Currently, most of the computer systems have comparatively low power requirements for each of the voltages produced by the power supply (e.g., less than safety limit 240 VA (or 20 A current for a 12V rail)) for sufficient operation.

Such comparatively low power deliveries are not hazardous to a user, and thus an overcurrent (or overpower) protection limit may be set below this level which meets safety standard requirement and prevents any injuries to the user that has access to the power supply circuit. However, a new generation of integrated circuits (e.g., processors) have power requirements that exceed 240 VA. Consequently, it is necessary to protect power supply circuits (primarily the +12V rail) accessible by a user against exceeding this power level in order to prevent injuries to the user.

One method of protecting against exceeding safety power limit accessible to the user in high power systems is to divide (split) the 12V rail into two or more rails. This method of protection is feasible for systems where the load may also be split into several independent load channels. In such cases, each of these channels would have individual 240 VA protection circuitry, but combined power delivered by all the channels may exceed this level.

Each protection circuit either limits the power at a lower level (below 240 VA), or almost instantly shuts the power supply off once the 240 VA limit is exceeded on any of the rails. However, splitting the loads and outputs into several rails, e.g., adding the channels, increases the power supply and system cost. Furthermore, this is only a viable option in cases where two or more integrated circuits are supplied. In instances where a single integrated circuit, such as a single processor, requires the full power delivery, other solutions are required.

One such solution is to introduce mechanical barriers to the computer system to prevent users from accessing the power supply circuit. However, the implementation of mechanical barriers increase the manufacturing costs of computer systems.

Another solution is to restrict access of the computer system to specially trained personnel. In most instances, such an alternative is unacceptable since the trend of computer systems is to be accessible to users.

BRIEF DESCRIPTION OF THE DRAWINGS

The invention is illustrated by way of example and not limitation in the figures of the accompanying drawings, in which like references indicate similar elements, and in which.

DETAILED DESCRIPTION

An over-current protection circuit for high power computer system power supplies is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
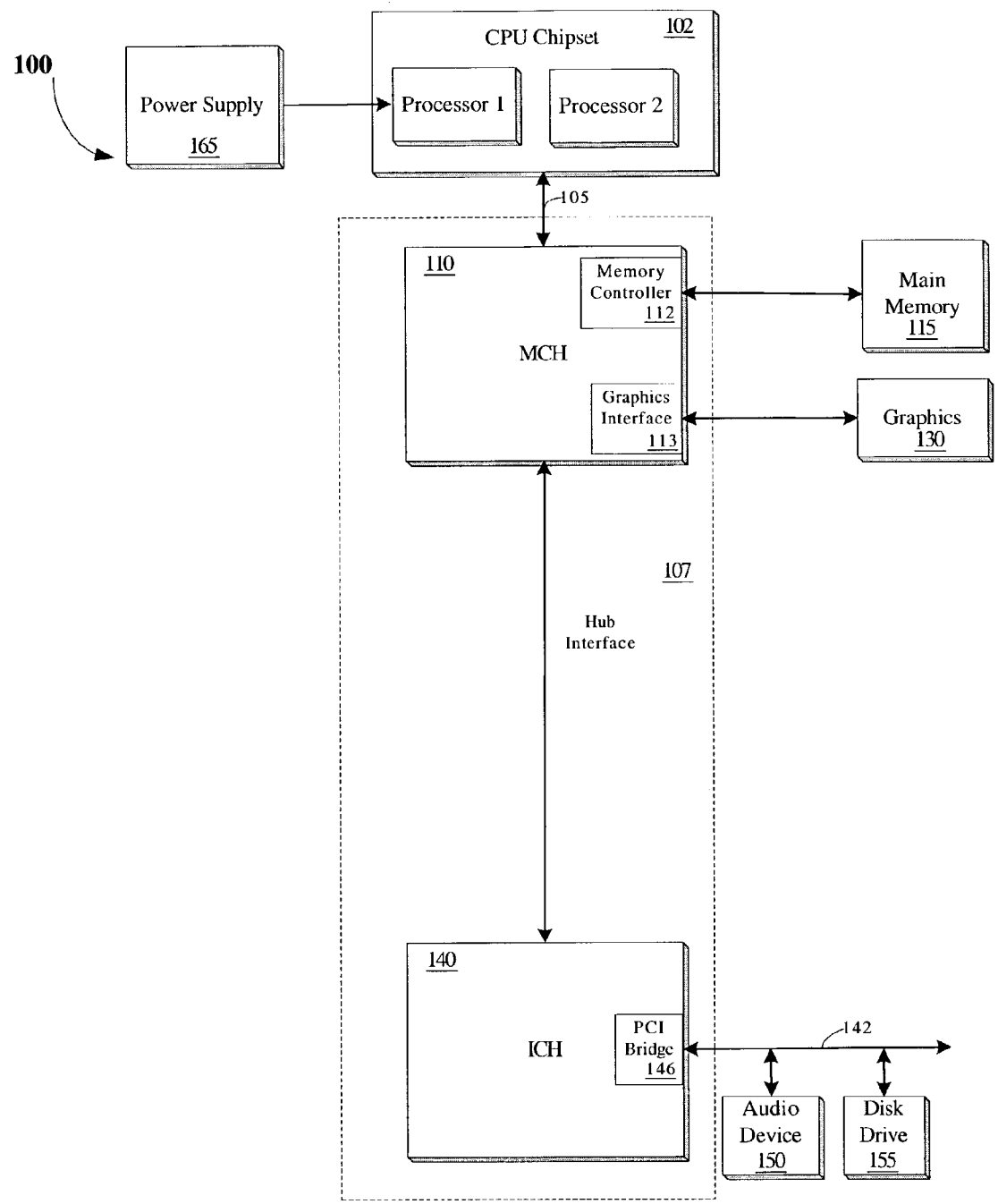
FIG. 1 is a block diagram of one embodiment of a computer system.

FIG. 1 is a block diagram of one embodiment of a computer system 100. Computer system 100 includes a central processing unit (CPU) chipset 102 coupled to bus 105. CPU chipset 102 includes processor 1 and processor 2. In one embodiment, each processor is a processor in the Pentium® family of processors including the Pentium® II processor family, Pentium® III processors, and Pentium® IV processors available from Intel Corporation of Santa Clara, Calif. Alternatively, other processors may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by a processor within CPU chipset 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

MCH 110 may also include a graphics interface 113 coupled to a graphics accelerator 130. In one embodiment, graphics interface 113 is coupled to graphics accelerator 130 via an accelerated graphics port (AGP) that operates according to an AGP Specification Revision 2.0 interface developed by Intel Corporation of Santa Clara, Calif.

In addition, the hub interface couples MCH 110 to an input/output control hub (ICH) 140 via a hub interface. ICH 140 provides an interface to input/output (I/O) devices within computer system 100. ICH 140 may be coupled to a Peripheral Component Interconnect bus adhering to a Specification Revision 2.1 bus developed by the PCI Special Interest Group of Portland, Oreg. Thus, ICH 140 includes a PCI bridge 146 that provides an interface to a PCI bus 142. PCI bridge 146 provides a data path between CPU 102 and peripheral devices.

PCI bus 142 includes an audio device 150 and a disk drive 155. However, one of ordinary skill in the art will appreciate that other devices may be coupled to PCI bus 142. In addition, one of ordinary skill in the art will recognize that CPU 102 and MCH 110 could be combined to form a single chip. Further graphics accelerator 130 may be included within MCH 110 in other embodiments.

In addition, computer system 100 includes a power supply 165 that supplies power to CPU chipset 102. According to one embodiment, chipset 102 requires in excess of 240 VA on a 12V rail for the operation of processor 1 and processor 2. As described above, operating voltages at such a high level require precautions to be made to protect users of computer system 100 from accessing power circuits with power level exceeding a 240 VA safety limit. According to one embodiment, an over-current protection (OCP) circuit is provided to protect against current surges that can lead dangerous short circuiting conditions.

Figure 2:
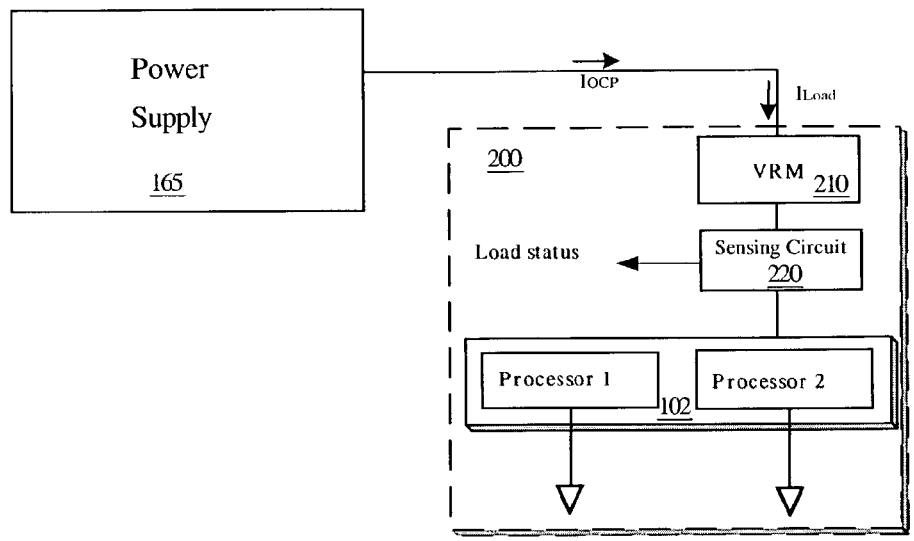
FIG. 2 is a block diagram of one embodiment of an over-current protection circuit.

FIG. 2 illustrates a block diagram of one embodiment of a power distribution circuit. In one embodiment, the power distribution circuit is comprised of components within power supply 165 and on the motherboard of computer system 100. However, one of ordinary skill in the art will appreciate that the OCP circuit can be implemented at other components or in a central component of computer system 100.

Referring to FIG. 2, power supply 165 and a motherboard 200 is shown. As discussed above, power supply 165 delivers power to motherboard 200 in excess of 240 VA. Motherboard 200 is a physical arrangement, such as a printed circuit board (PCB) in a computer system that includes the computer system's basic circuitry and components. Motherboard 200 includes a voltage regulator module (VRM) 210, a sensing circuit 220, and CPU chipset 102 including processor 1 and processor 2.

VRM 210 is coupled to power supply 165. VRM 210 provides power to the processors at CPU chipset 102. In particular, VRM 210 receives a 12 VDC voltage from power supply 165 and converts the received voltage to a lower voltage (e.g., 1.5V) for processor operation. Sensing circuit 220 is coupled to VRM 210, CPU chipset 102 and motherboard 200.

Sensing circuit 220 measures the current consumed by processor chipset 102 or VRM 210. The measured current is transmitted to motherboard 200 as a load status voltage signal for monitoring the load consumed current. According to one embodiment, sensor circuit 220 is implemented with a low impedance resistor. However, one of ordinary skill in the art will appreciate that other components may be used to implement sensor circuit 220.

Figure 3:
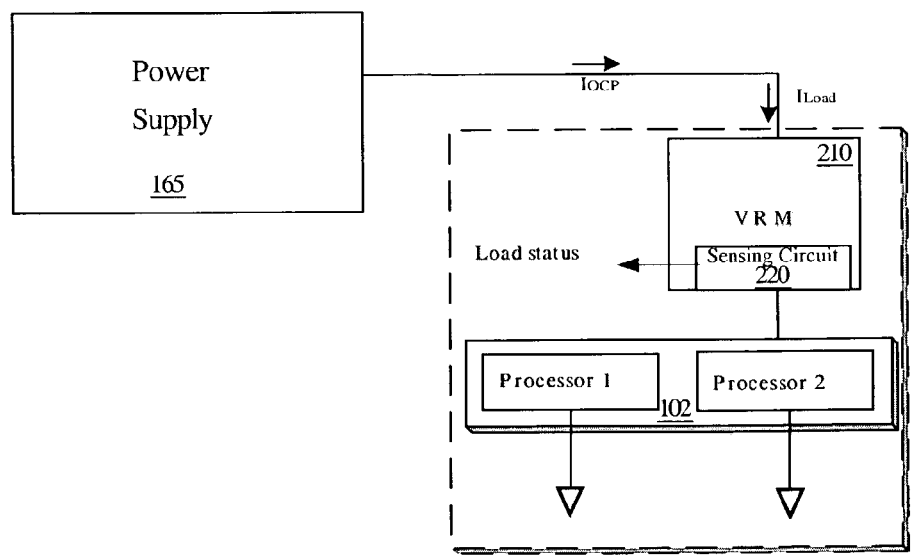
FIG. 3 is a block diagram of another embodiment of an over-current protection circuit.
Figure 4:
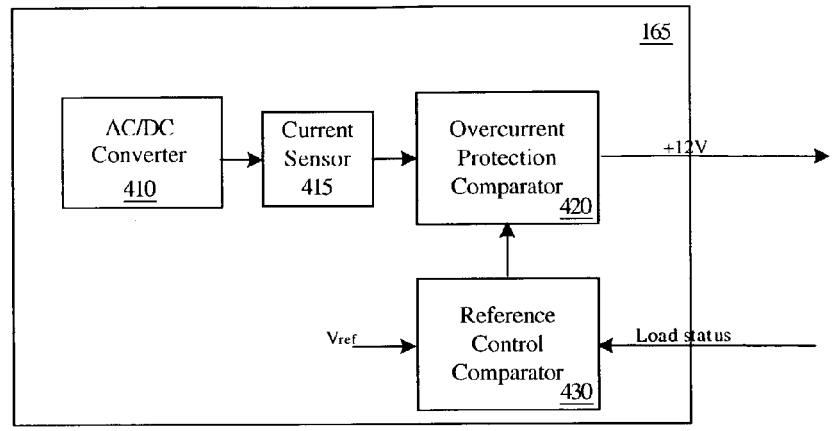
FIG. 4 is a block diagram of one embodiment of a power supply.

FIG. 3 illustrates a block diagram of another embodiment of a power distribution circuit. In this embodiment, sensing circuit 220 is integrated with in VRM 210. FIG. 4 illustrates one embodiment of power supply 165. Power supply 165 includes AC/DC converter 410, current sensor 415, OCP comparator 420, and reference control comparator (RCC) 430.

AC/DC converter 410 converts a received AC voltage source into a 12 VDC voltage signal. In one embodiment, AC/DC converter 410 converts 120 VAC signal to an output voltage signal. Current sensor 415 senses current supplied by power supply 165 to the load, such as VRM 210. OCP comparator 420 is coupled to current sensor 415 and VRM 210 at motherboard 200.

OCP comparator 420 compares the input voltage (proportional to load current) received from current sensor 415 with a reference voltage. Once the input voltage exceeds the reference voltage the comparator 420 trips and shuts AC/DC converter 410 (and power supply 165) off. This provides an over-current protection for AC/DC converter 410 and a safety protection for the user.

According to one embodiment, OCP comparator 420 is implemented as an OCP component. However, one of ordinary skill in the art will appreciate that other components that either shut down the converter, or limit the load current at certain level may be used to implement an OCP function.

RCC 430 is coupled to OCP 420 and sensing circuit 220 at motherboard 200. RCC 430 receives the load status voltage signal from sensing circuit 220, compares the received signal with reference voltage $V_{ref}$ and controls a reference voltage of OCP comparator 420. In one embodiment, the reference voltage $V_{ref}$ determines whether RCC 430 switches its output on or off. Thus, when power consumed by VRM 210 is low (for example, in a sleep mode), the load current is low and the load status signal voltage, which is proportional to the load current (VRM input), remains below the RCC reference voltage $V_{ref}$. Consequently, the RCC 430 output does not change state so that the OCP comparator 420 threshold (reference) voltage remains low.

Once the load current exceeds a predetermined limit $I_{threshold}$, the load status signal received at RCC 430 exceeds the reference voltage $V_{ref}$. As a result, RCC 430 trips and boosts the reference voltage of OCP comparator 420, e.g., switches the over-current protection limit (trip point) to a higher level. The higher over-current protection limit enables the processors within CPU chipset 102 to consume more power than it had been set when RCC 430 was switched off.

Once the load current drops below the predetermined limit $I_{threshold}$, RCC 430 again switches back off and lowers the reference voltage of the OCP comparator 420. Consequently, the over-protection limit is set back to the lower limit, preventing the load from consuming more power than 240 W (240 VA).

Figure 5:
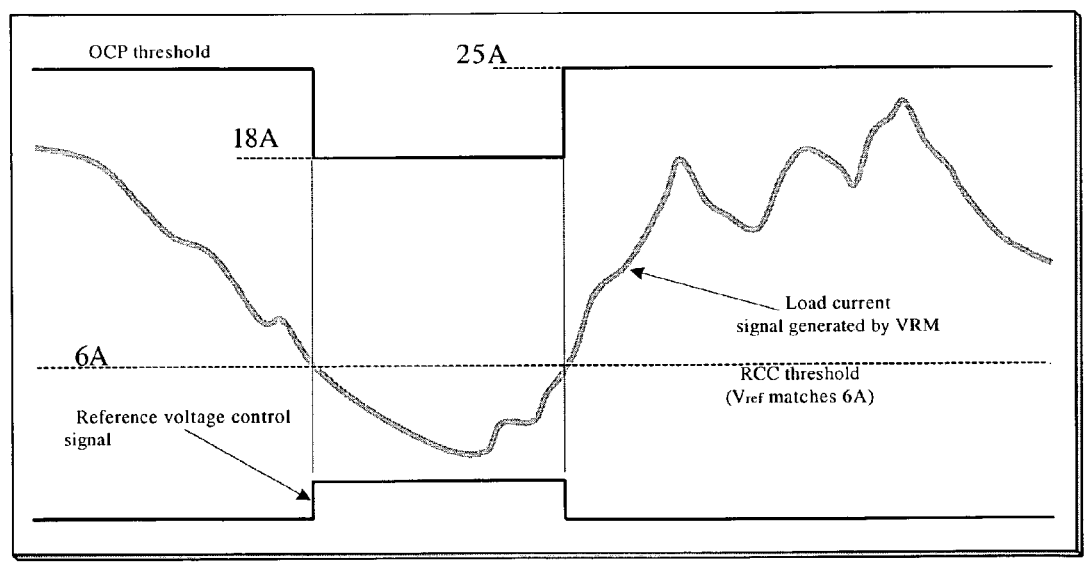
FIG. 5 is a graphical representation illustrating one embodiment of threshold changes at an over-current protection circuit.

FIG. 5 illustrates the above-described threshold transitions. In the over-current protection circuit, the over-current protection threshold depends on load current (e.g., power consumed by the load (in this case VRM 210 and CPU chipset 102)). Once the load current drops below the predetermined threshold $I_{threshold}$ (e.g., 6 A), RCC 430 generates the reference voltage control signal, which changes the OCP 420 threshold (e.g., from 25 A to 18 A). Once the load current exceeds the RCC threshold, the OCP comparator 420 threshold returns to its original level (25 A).

As illustrated above, the OCP circuit prevents an over-current condition caused by an overloading or a short circuit condition across the power supply 165 output (or voltage rail (See FIGS. 2 and 3)) by detecting the load status of an integrated circuit such as VRM 210 and CPU chipset 102.

If the output is bridged while a large load is being drawn by CPU chipset 102 via a relatively high current limit, the current available for the bridge will not exceed the safety limit, since the larger portion of the current, which the power supply is capable to deliver, will be consumed by the load (VRM 210). Based on Kirchhoff's First Law the sum of the currents that enter a junction is equal to the sum of the currents that leave it.

Accordingly, the maximum current flowing through a 240 VA short circuit crowbar (that may be placed between the voltage rail and any grounding point) will be equal to the change between the OCP threshold and a load current. Therefore, current available for the 240 VA crowbar would not exceed 20 A (or 240 VA power limit) if the RCC 430 threshold is set so that the change between an over-current protection and the RCC 430 threshold is less than 20 A (e.g., $I_{OCP}-I_{threshold}<20$ A; or $I_{OCP}<I_{threshold}+20$ A).

As an example, if $I_{threshold}$ is set close to 20 A, power available for VRM 210 will be almost doubled as compared to the allowed 240 W level. Thus, by increasing the number of steps (or RCC thresholds), current available to the processors could be further increased. In one embodiment, the multi-threshold function could also be implemented with the help of a microcontroller.

Figure 6:
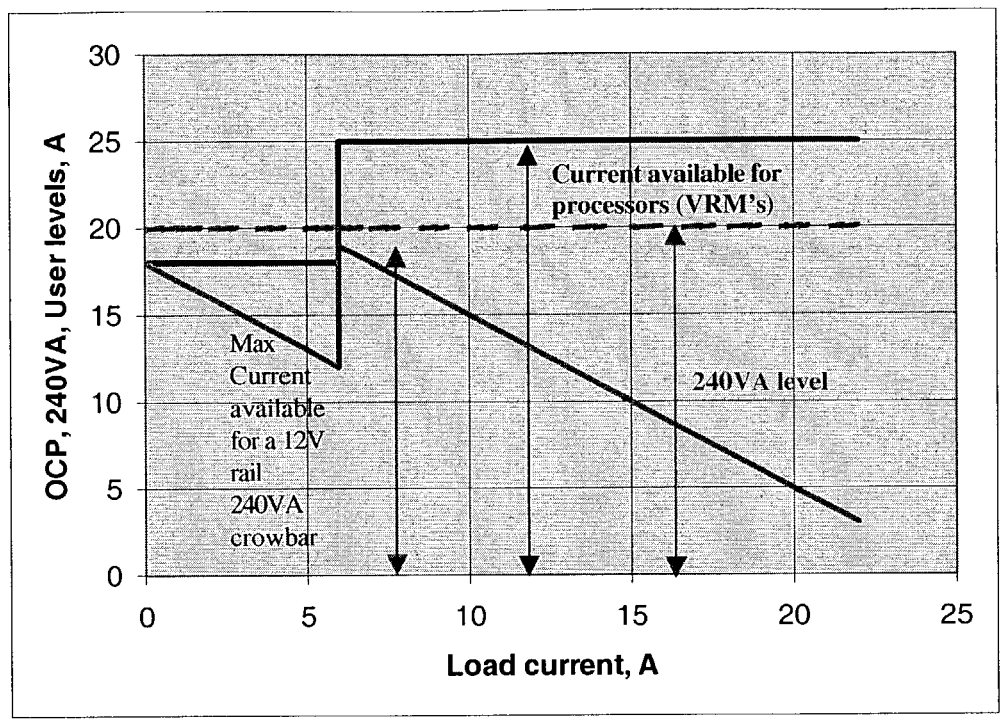
FIG. 6 is a graphical representation illustrating one embodiment of maximum current available implemented by an over-current protection circuit during operation.

FIG. 6 is a graphical representation illustrating one embodiment of maximum current available implemented by the over-current protection circuit. FIG. 6 shows that the maximum current available for the 12V (240 VA) crowbar $I_{240max}$ equals 19 A, which does not exceed the 20 A level required for safety standards, while current available for the processors equals 25 A (power=12*25=300 W). Note that using Kirchhoff's first law: $I_{240max}=\max(I_{OCP}-I_{load})$. The OCP level $I_{OCP}=25$ A (e.g., 300 W available for processors); with load status threshold level $I_{threshold}=6$ A. Thus, the worst case 240 VA crowbar current $(I_{load}=I_{threshold})$: $I_{240\ max}=(I_{OCP}-I_{threshold})=19$ A<20 A (240 VA).

Figure 7:
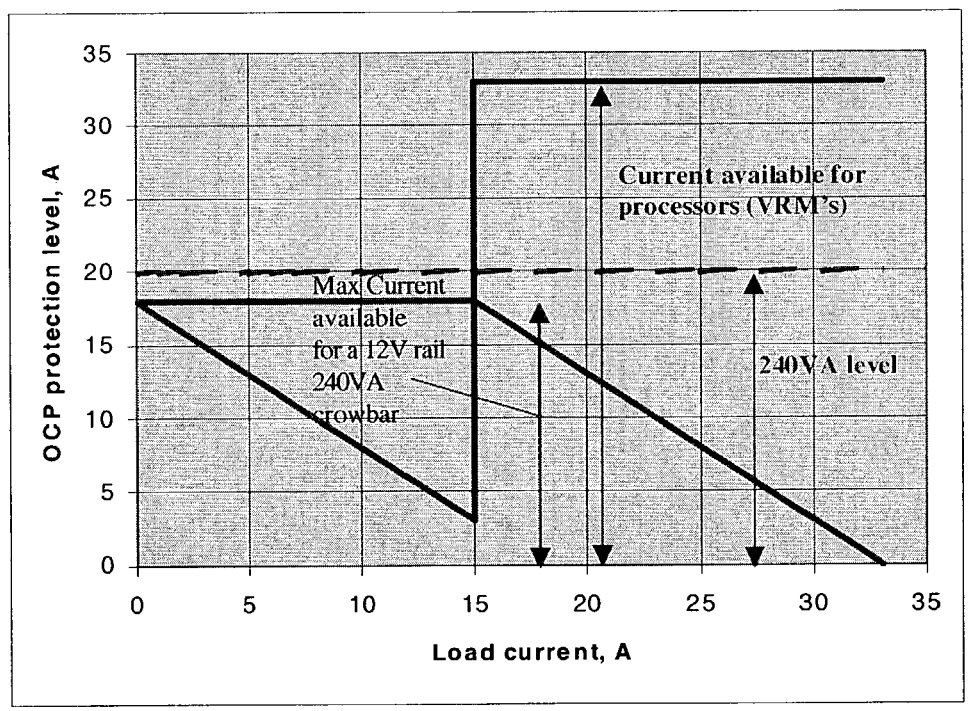
FIG. 7 is a graphical representation illustrating another embodiment of maximum current available implemented by an over-current protection circuit during operation.

FIG. 7 is a graphical representation illustrating another embodiment of maximum current available implemented by the over-current protection circuit. FIG. 7 shows that by boosting the threshold level closer to 240 VA level (e.g., from 6 A to 15 A,), the maximum current available for the 12 v crowbar still does not exceed the 20 A (e.g., 18 A) level required for safety standards, while current available for processors reaches 33 A (power=12*33=396 W). In this instance, the OCP level $I_{OCP}=33$ A (396 W available for processors); with load status threshold level $I_{threshold}=15$ A. Thus, the worst case crowbar current $I_{240\ max}=(I_{OCP}-I_{threshold})=18$ A <20 A (240 VA).

The over-current protection circuit, increases power available for processor VRMs above the 240 W limit while meeting the 240 VA safety requirement, and thus resolves the conflicting requirements of increasing the power consumed by processors above 240 W, and providing safe user access to the baseboard area and system components.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer system comprising:
   an integrated circuit (IC);
   a power supply to supply power to the IC; and
   an over-current protection (OCP) circuit including:
     an OCP comparator to shut down the power supply if an input voltage to the IC exceeds a reference voltage; and
     a reference control comparator (RCC) to receive a load status voltage from the IC and to dynamically control the magnitude of the reference voltage based on the load status voltage received from the IC.

2. The computer system of claim 1 wherein the OCP circuit further comprises:
   a sensing circuit, coupled to the IC and the RCC, to detect the magnitude of current drawn by the IC.

3. The computer system of claim 2 wherein the RCC transmits a first reference voltage to the OCP comparator if the status voltage is less than the first reference voltage.

4. The computer system of claim 3 wherein the power supply current generation is set to a first current threshold if the status voltage is less than the first reference voltage.

5. The computer system of claim 4 wherein the RCC transmits a second reference voltage to the OCP comparator if the status voltage is greater than the first reference voltage.

6. The computer system of claim 3 wherein the power supply current generation is set to a second current threshold if the status voltage is greater than first the reference voltage.

7. The computer system of claim 6 wherein the second current threshold is greater than the first current threshold.

8. The computer system of claim 2 further comprising a voltage regulator module coupled the OCP comparator and the sensing circuit.

9. The computer system of claim 2 wherein the sensing circuit is included within a voltage regulator module.

10. The computer system of claim 2 wherein the RCC and the OCP comparator are included within the power supply.

11. The computer system of claim 1 wherein the IC is a central processing unit (CPU) chipset.

12. The computer system of claim 11 wherein the CPU chipset comprises:
   a first CPU; and
   a second CPU.

13. The computer system of claim 2 wherein the sensing circuit is a resistor.

14. A method comprising:
   detecting a load current at a sensing circuit on a printed circuit board;
   comparing a load voltage corresponding to the load current with a first reference voltage;
   setting a current generated by a power supply at a first threshold if the load voltage is less than the first reference voltage; and
   establishing a second reference voltage if the load voltage is greater than the first reference voltage, wherein the second reference voltage is greater than the first reference voltage.

15. The method of claim 14 further comprising setting the current generated by the power supply at a second threshold if the load voltage is greater than the first reference voltage.

16. A power distribution circuit comprising:
   a power supply;
   a sensing circuit to detect the magnitude of current drawn by an integrated circuit (IC) load;
   an OCP comparator to shut down the power supply if the IC load exceeds a reference voltage; and a reference control comparator (RCC) to receive a load status voltage from the IC and to dynamically control the magnitude of the reference voltage based on the load status voltage received from the IC.

17. The power distribution circuit of claim 16 further comprising a current sensor coupled to the OCP comparator.

18. The power distribution circuit of claim 16 wherein the RCC transmits a first reference voltage to the OCP comparator if the status voltage is less than the first reference voltage.

19. The power distribution circuit of claim 18 wherein the power supply current generation is set to a first current threshold if the status voltage is less than the first reference voltage.

20. The power distribution circuit of claim 19 wherein the RCC transmits a second reference voltage to the OCP comparator if the status voltage is greater than the first reference voltage.

21. The power distribution circuit of claim 18 wherein the power supply current generation is set to a second current threshold if the status voltage is greater than first the reference voltage.

22. The power distribution circuit of claim 21 wherein the second current threshold is greater than the first current threshold.

23. The power distribution circuit of claim 16 further comprising a voltage regulator module coupled the OCP comparator and the sensing circuit.

* * * * *